(12) United States Patent  (10) Patent No.: US 9,128,113 B2
Henderson et al.  (45) Date of Patent: Sep. 8, 2015

(54) VEHICLE ORIENTATION INDICATOR

(71) Applicant: Nissan North America, Inc., Franklin, TN (US)

(72) Inventors: Christopher Henderson, Belleville, MI (US); Sarah Escutia, Warren, MI (US); Philip Majtan, Highland, MI (US); Petar Vucelic, Wixom, MI (US); Daryl Smith, Howell, MI (US); Nathan Bartnicki, Belleville, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 104 days.

(21) Appl. No.: 14/165,489

(22) Filed: Jan. 27, 2014

(65) Prior Publication Data

US 2015/0212106 A1 Jul. 30, 2015

(51) Int. Cl.
*G05D 1/00* (2006.01)
*G01P 15/00* (2006.01)

(52) U.S. Cl.
CPC ...................................... *G01P 15/00* (2013.01)

(58) Field of Classification Search
USPC ............................................................ 701/1
See application file for complete search history.

(56) References Cited

U.S. PATENT DOCUMENTS

| | | | |
|---|---|---|---|
| 4,480,714 A | 11/1984 | Yabuta et al. | |
| 5,684,698 A | 11/1997 | Fujii et al. | |
| 5,825,284 A | 10/1998 | Dunwoody et al. | |
| 6,338,012 B2 | 1/2002 | Brown et al. | |
| 6,861,949 B2 | 3/2005 | Carlson et al. | |
| 6,885,924 B2 | 4/2005 | Ford et al. | |
| 7,079,018 B2 | 7/2006 | Hottebart et al. | |
| 7,352,281 B2 | 4/2008 | Stevenson | |
| 2006/0052933 A1* | 3/2006 | Ota | 701/200 |
| 2006/0184299 A1 | 8/2006 | Wu et al. | |
| 2007/0282488 A1* | 12/2007 | Kato et al. | 701/1 |
| 2008/0174417 A1 | 7/2008 | Schubert | |
| 2008/0258890 A1* | 10/2008 | Follmer et al. | 340/439 |
| 2008/0309764 A1* | 12/2008 | Kubota et al. | 348/148 |
| 2010/0191408 A1 | 7/2010 | Boylston et al. | |
| 2011/0037621 A1* | 2/2011 | Fujiwara et al. | 340/995.27 |
| 2012/0050138 A1* | 3/2012 | Sato et al. | 345/4 |
| 2012/0154178 A1* | 6/2012 | Schmidt | 340/946 |
| 2012/0221677 A1* | 8/2012 | Kim et al. | 709/217 |
| 2013/0004282 A1* | 1/2013 | Grimes et al. | 414/698 |
| 2013/0158778 A1* | 6/2013 | Tengler et al. | 701/31.5 |

(Continued)

FOREIGN PATENT DOCUMENTS

DE 102006045303 B3 2/2008
WO 2013120546 A1 8/2013

*Primary Examiner* — Hussein Elchanti
(74) *Attorney, Agent, or Firm* — Global IP Counselors, LLP

(57) ABSTRACT

A vehicle orientation indicator comprises a sensor and a controller. The sensor is configured to sense a gravitational force component imposed on a vehicle. The controller is configured to determine an orientation of the vehicle with respect to a fixed plane based on the sensed gravitational force component and control an indicator device to provide a representation of the orientation of the vehicle. The controller is further configured to control the indicator device to update the representation of the orientation of the vehicle based on a change in the sensed gravitational force component as sensed by the sensor while a movement condition of the vehicle meets a prescribed condition, and to control the indicator device to refrain from updating the representation of the orientation of the vehicle while the movement condition fails to meet the prescribed condition.

14 Claims, 10 Drawing Sheets

(56) References Cited

U.S. PATENT DOCUMENTS

| | | | |
|---|---|---|---|
| 2013/0201013 A1* | 8/2013 | Schoenberg | 340/438 |
| 2013/0211707 A1* | 8/2013 | Washlow et al. | 701/411 |
| 2013/0245882 A1* | 9/2013 | Ricci | 701/36 |

* cited by examiner

VEHICLE ORIENTATION INDICATOR

BACKGROUND

1. Field of the Invention

The present invention generally relates to a vehicle orientation indicator. More specifically, the present invention relates to a vehicle orientation indicator that eliminates spurious data pertaining to the pitch and roll of the vehicle to provide a more stable and accurate indication of the orientation of the vehicle.

2. Background Information

In order to enhance a driver's experience, a vehicle can be equipped with various types of instruments that indicate various conditions of the vehicle. For instance, a vehicle may include a pitch and roll sensor that provides an indication of the vehicle's pitch and roll with respect to a level horizontal plane to enable a driver to better assess the orientation of a vehicle. These features can be particularly useful during off-road driving conditions during which a vehicle may experience large changes in pitch and roll. However, rapid changes in movement of the vehicle can adversely affect the reliability of data obtained by the sensors based on which the pitch and roll are determined, and thus adversely affect the reliability of the pitch and roll indication.

SUMMARY

It has been discovered that it is desirable for a vehicle orientation indicator to be capable of eliminating spurious data pertaining to the pitch and roll of a vehicle to provide a more reliable indication of the vehicle's true pitch and roll states.

In view of the state of the known technology, one aspect of the present invention provides a vehicle orientation indicator comprising a sensor and a controller. The sensor is configured to sense a gravitational force component imposed on a vehicle. The controller is configured to determine an orientation of the vehicle with respect to a fixed plane based on the sensed gravitational force component and control an indicator device to provide a representation of the orientation of the vehicle. The controller is further configured to control the indicator device to update the representation of the orientation of the vehicle based on a change in the sensed gravitational force component as sensed by the sensor while a movement condition of the vehicle meets a prescribed condition, and to control the indicator device to refrain from updating the representation of the orientation of the vehicle while the movement condition fails to meet the prescribed condition.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
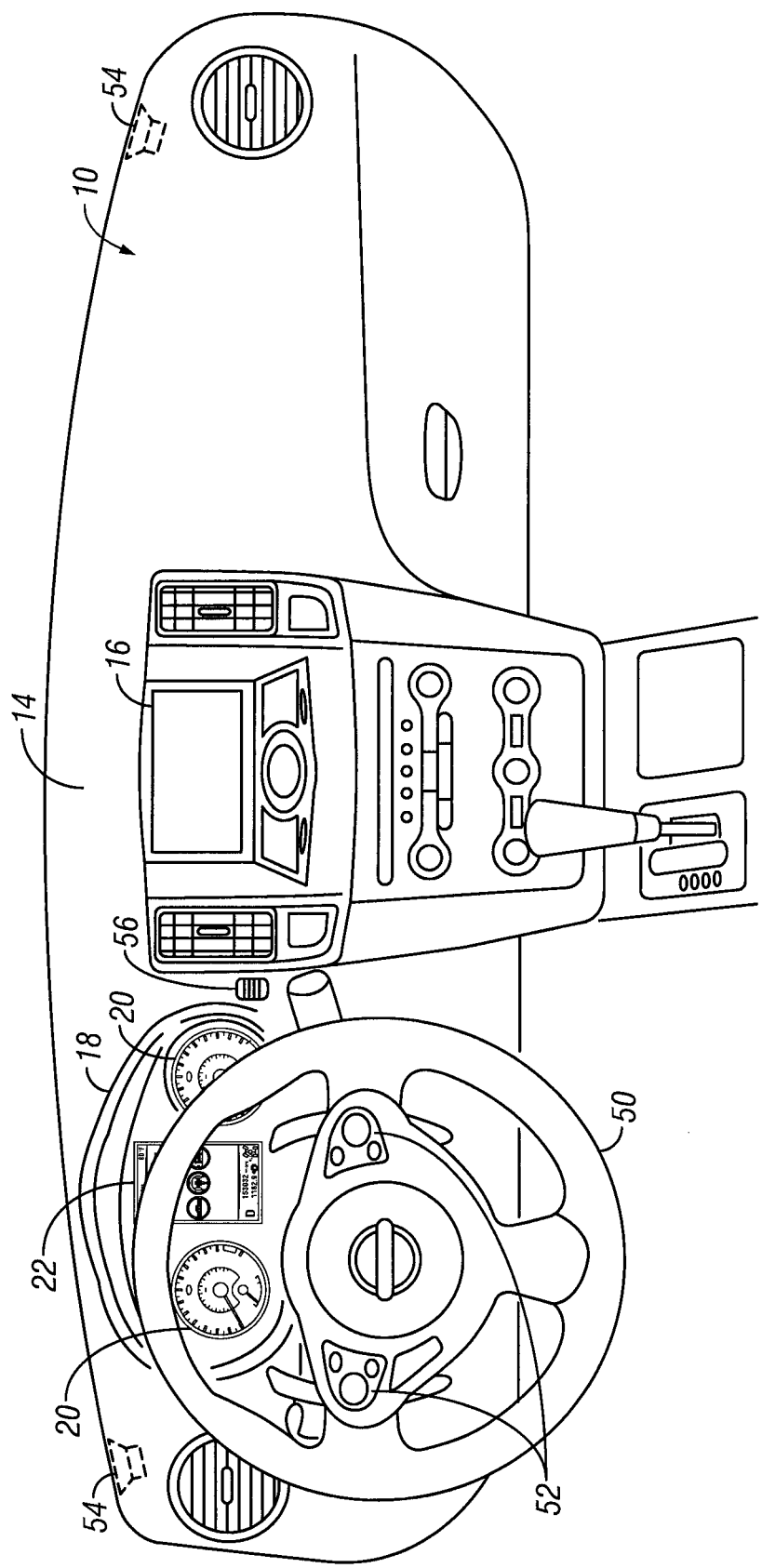
FIG. 1 is an exemplary view of the front of the passenger compartment of a vehicle employing a vehicle orientation indicator system according to an embodiment of the present invention.
Figure 2:
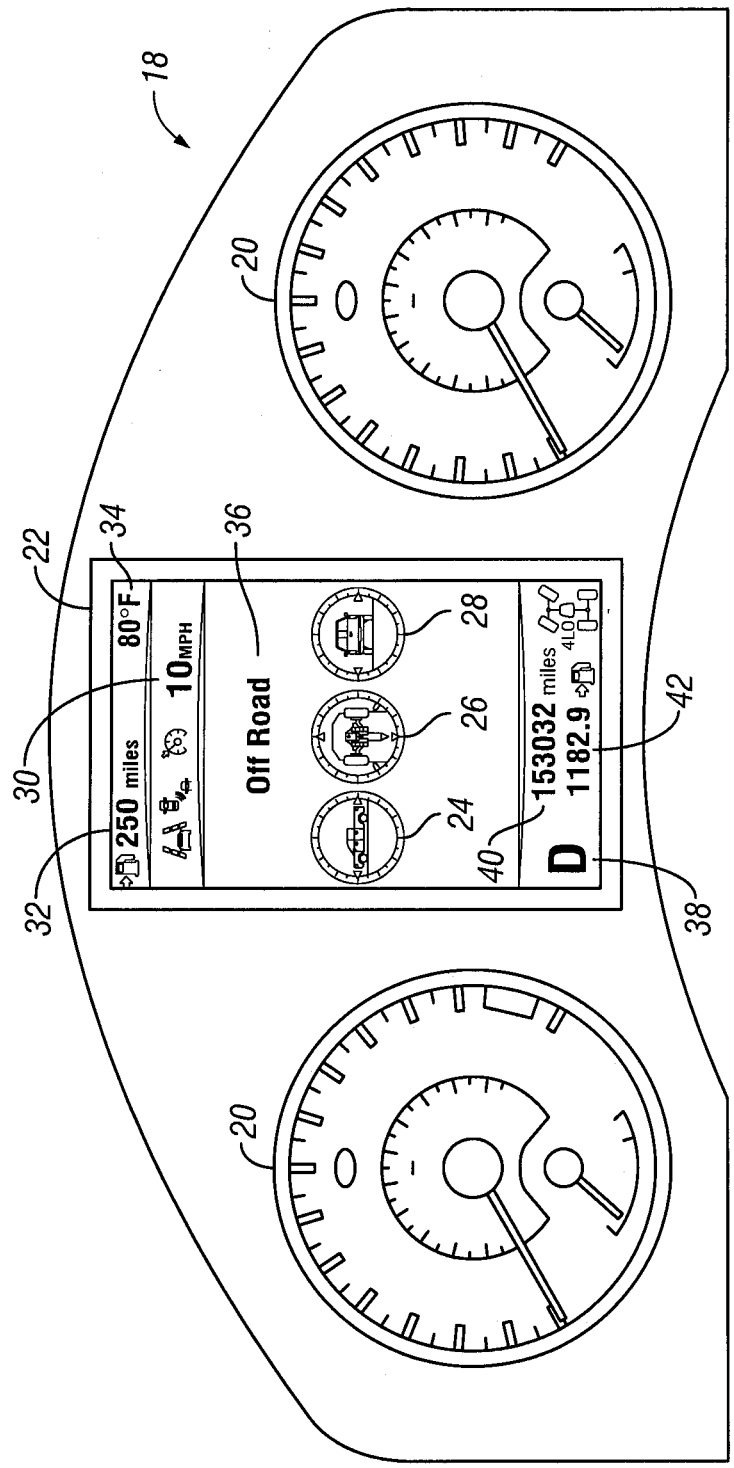
FIG. 2 is an exemplary view of the meter cluster of the passenger compartment shown in FIG. 1 which includes a meter display of the vehicle orientation indicator system.

Referring initially to FIG. 1, a passenger compartment 10 of a vehicle 12 employing an embodiment of the present invention is illustrated. The vehicle 12 can be, for example, a truck, an SUV, an automobile or any other suitable type of vehicle. The passenger compartment 10 includes an instrument panel 14 which, in this example, has a display 16, which is typically referred to as a primary or secondary display, and a meter cluster 18. Typically, the display 16 includes features for a navigation display and/or an audio system display. On the other hand, as shown in more detail in FIG. 2, the meter cluster 18 generally includes meters 20, such as a speedometer, tachometer and gauges. In this embodiment, the meter cluster 18 also includes a vehicle orientation indicator 22, which can be referred to as a primary or secondary display.

As indicated, the vehicle orientation indicator 22 provides, for example, an indication of the pitch angle 24 of the vehicle 12 with respect to a level horizontal plane H (see FIGS. 10 through 13), the wheel angle 26 of the turning wheels (e.g., the front wheels) of the vehicle 12, and an indication of the roll angle 28 of the vehicle 12 with respect to the level horizontal plane H (see FIGS. 16 through 19). The pitch angle 24, the wheel angle 26 and the roll angle 28 can be represented in any increments of degree, such as 1 degree increments, ½ degree increments, ⅒ degree increments and so on, and can have any suitable range of degrees, such as +30 degrees to −30 degrees or any suitable range. The vehicle orientation indicator 22 can further display information such as the speed 30 of the vehicle 12, a distance to empty indication 32, the temperature 34 external to the vehicle 12, an off road indicator 36 which indicates whether the vehicle 12 is being driven in an off road environment, a gear position indictor 38, an odometer 40, a trip indicator 42 and any other suitable information. Furthermore, although in this example the vehicle orientation indicator 22 is disposed in the meter cluster 18 of the vehicle 12, the vehicle orientation indicator 22 can be displayed on all or a portion of the display 16, or at any other suitable location within the passenger compartment 10. Furthermore, the vehicle orientation indicator 22 need not be integrated into the instrument panel 14, but can be a separate unit that can be removably secured in the passenger compartment 10, or can be any other suitable type of display such as a heads-up windshield display and so on.

As further shown in FIG. 1, a steering wheel 50 extends from the instrument panel 12. The steering wheel 50 typically has steering wheel controls 52 as known in the art. In this example, the meter cluster 18 is directly aligned with the central longitudinal axis of the column of the steering wheel 50 and, in particular, the vehicle orientation indicator 22 is directly aligned with or substantially aligned with the central longitudinal axis of the steering wheel column. However, the location of the meter cluster 18, as well as the positioning of the vehicle orientation indicator 22 in the meter cluster 18, can be changed as deemed practical or desirable. In addition, as shown in FIG. 1, typically two or more speakers 54 can be present in the instrument panel 14, or at any other suitable location in the vehicle 12. These speakers 54 can be used as radio speakers and to audibly output commands or messages from, for example, the vehicle orientation indicator system of the vehicle 12 as discussed in more detail below. Also, a microphone 56 can be present in the instrument panel 14 or at any other suitable location in the vehicle 12, and can be used to receive voice commands for the vehicle orientation indicator system 60 as can be appreciated by one skilled in the art.

Figure 3:
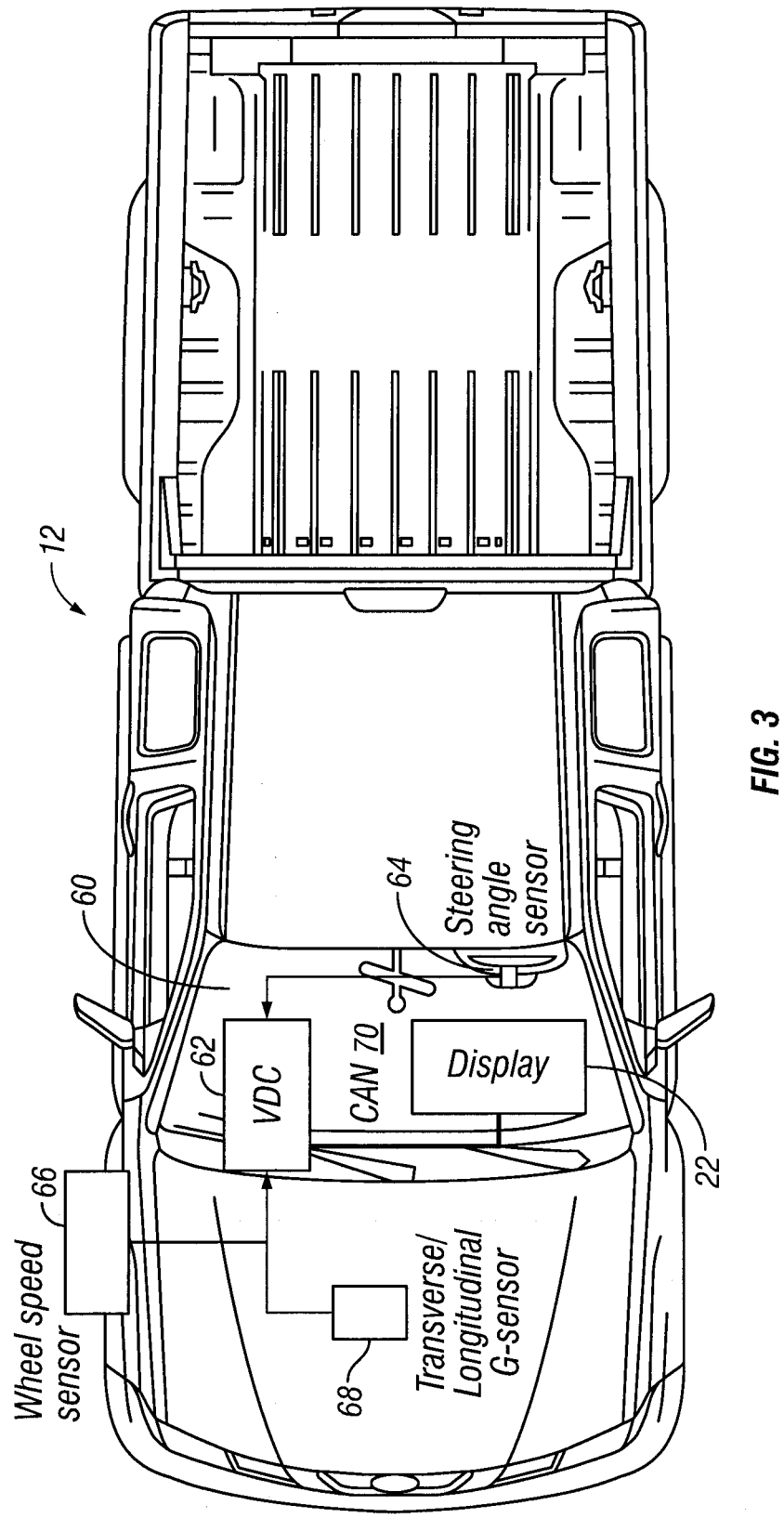
FIG. 3 is a top view of a vehicle including an exemplary block diagram of components of the vehicle orientation indicator system employed in the vehicle.

FIG. 3 is an exemplary block diagram of components of the vehicle orientation indicator system 60 according to an embodiment of the present invention that is employed in the vehicle 12 as discussed above. The vehicle orientation indicator system 60 includes the vehicle orientation indicator 22 as discussed above, a vehicle dynamic control (VDC) module 62, a steering angle sensor 64, a wheel speed sensor 66 and a transverse/longitudinal gravitational force sensor (g-sensor) 68 as understood in the art. The vehicle orientation indicator 20, a vehicle dynamic control module 62, a steering angle sensor 64, a wheel speed sensor 66 and a transverse/longitudinal gravitational force sensor 68 can communicate with each other in any suitable manner, such as via wired connections, wireless connections, via a controller area network 70 (CAN) and so on.

Figure 4:
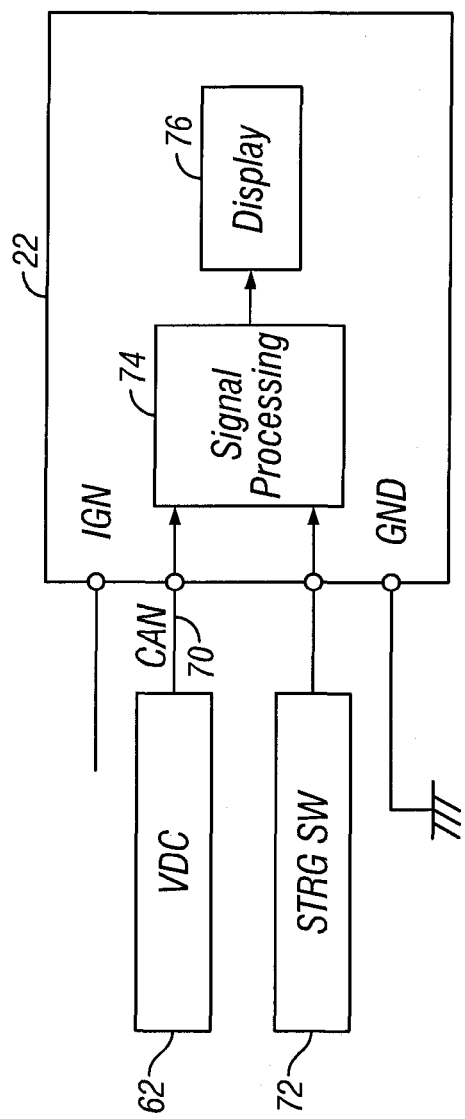
FIG. 4 is a block diagram of an example of components of the meter display of the vehicle orientation indicator system.

As further shown in FIG. 4, the vehicle orientation indicator system 60 can include a user control device 72 (e.g., a steering wheel switch) that allows occupants to control display properties of the vehicle orientation indicator 22. The vehicle orientation indicator 22 can include a signal processing component 74 as discussed in more detail below, and display hardware such as display 76, which can be a thin film transistor (TFT) display that displays the information discussed above and in more detail below. The display hardware can include a data storage component, which can be any suitable type of memory as known in the art. In this example, the vehicle orientation indicator 20 can be connected to the ignition power IGN and ground to be powered when the vehicle ignition is started, or can be powered in any other suitable manner. Alternatively or in addition, the display 76 can be configured as a portion of or all of the display 16 or as any other type of display as appreciated in the art.

As can be appreciated by one skilled in the art, the vehicle dynamic control module 62 preferably includes a microcomputer with a control program that sends raw sensor data to the signal processing component 74 as discussed herein. The vehicle dynamic control module 62 can also include other conventional components such as an input interface circuit, an output interface circuit, and storage devices such as a ROM (Read Only Memory) device and a RAM (Random Access Memory) device. The RAM and ROM store processing results and control programs that are run by the vehicle dynamic control module 62. The vehicle dynamic control module 62 is operatively coupled to the components of the vehicle orientation indicator system 60, and to the components of the vehicle 12 as appropriate, in a conventional manner. It will be apparent to those skilled in the art from this disclosure that the precise structure and algorithms for the vehicle dynamic control module 62 can be any combination of hardware and software that will carry out the functions of the present invention. Moreover, the signal processing component 74 can include a microcomputer with the appropriate control program, and other conventional components such as an input interface circuit, an output interface circuit, and storage devices such as ROM and RAM devices as discussed above. The signal processing component 74 and the vehicle dynamic control module 62 can be integrated into a single controller, operate as separate components or be arranged in any other suitable manner.

Figure 5:
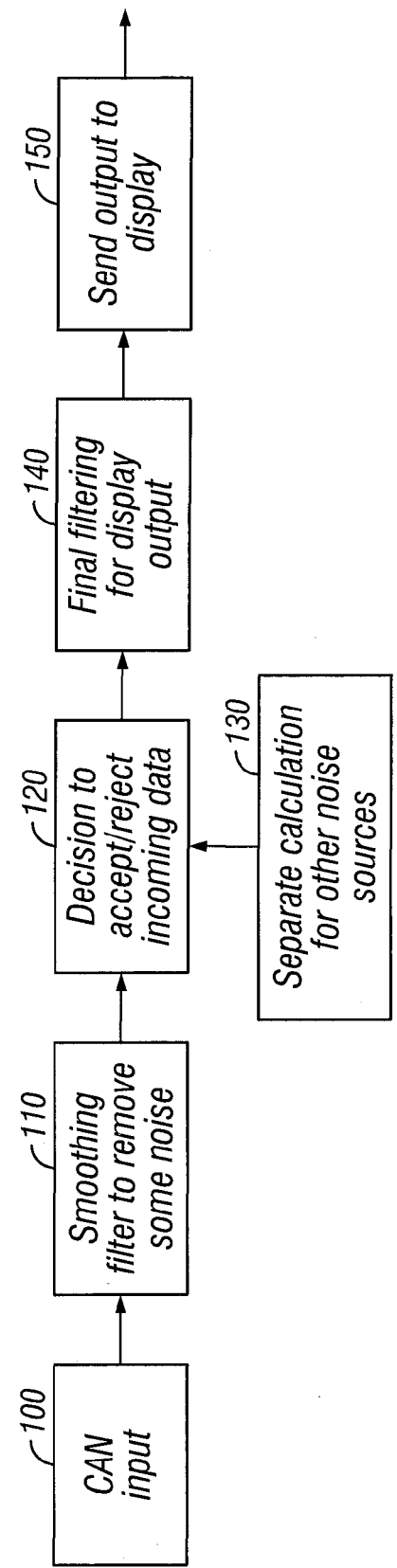
FIG. 5 is an exemplary flow diagram illustrating an example of processes performed by the vehicle orientation indicator system.

FIG. 5 is a flow diagram illustrating an example of processes that can be performed by the signal processing component 74 of the vehicle orientation indicator system 60 described herein. As shown in step 100, the signal processing component 74 receives data pertaining to the steering angle of the vehicle 12 as detected by the steering angle sensor 64, data pertaining to the wheel speed of the vehicle 12 as detected by the wheel speed sensor 66, and data pertaining to the gravitational forces imposed on the vehicle 12 as detected by the transverse/longitudinal gravitational force sensor 68. The signal processing component 74 can receive the data from the steering angle sensor 64, the wheel speed sensor 66, and the transverse/longitudinal gravitational force sensor 68 (collectively referred to as "the data") via the CAN 70 or in any other suitable manner. In step 110, the signal processing component 74 performs smoothing operations to remove noise from the data in any suitable manner as understood in the art. In step 120, the signal processing component 74 determines whether to accept or reject the data based on certain criteria as discussed in more detail below with regard to the flowcharts shown in FIGS. 8 and 14. In doing so, the signal processing component 74 can perform separate calculations in step 130 to remove noise from other sources in any suitable manner as understood in the art. The signal processing component 74 can perform additional filtering in step 140 in any suitable manner, and then in step 150 provide the filtered data to the display 76 for display as shown, for example, in FIG. 2 discussed above.

Further details pertaining to the manner in which the signal processing component 74 processes the data will now be described. In general, the signal processing component 74 processes the data that causes the display 76 to display the pitch and roll angles to ensure that the indicated pitch and roll angles are accurate and displayed in an intuitive manner that avoids confusion by the driver. For instance, the signal processing component 74 translates the data from the steering angle sensor 64, the wheel speed sensor 66, and the transverse/longitudinal gravitational force sensor 68 into vehicle pitch and roll angles and displays the values to a driver on the display 76 during, for example, off-road driving maneuvers.

The signal processing component 74 can limit the refresh rates of the displayed values of the pitch and roll angles and the maximum incremental change in either of the pitch and roll angles as a function of vehicle speed. For instance, a longer refresh time and smaller incremental changes are allowed at higher vehicle speeds. However, the displayed values of the pitch and roll angles may not be updated when, for example, the linear acceleration of the vehicle 12 caused by speeding up or braking exceeds a predetermined value (e.g., would change the angle by more than 1 degree). Also, the displayed values of the pitch and roll angles may not be updated when, for example, the centrifugal acceleration of the vehicle 12 (e.g., caused by turning) exceeds a predetermined value as determined by the vehicle speed and steering wheel angle.

Figure 6:
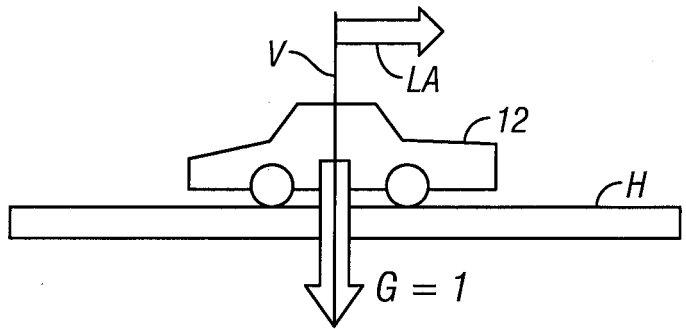
FIG. 6 is a diagram illustrating an exemplary indication of a direction of a force occurring on the vehicle due to braking or acceleration of the vehicle.
Figure 7:
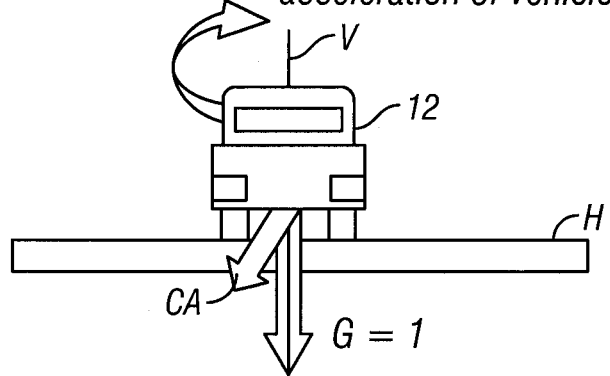
FIG. 7 is a diagram illustrating an exemplary indication of a direction of a force occurring on the vehicle due to turning of the vehicle.

As shown in FIG. 6, the linear acceleration of the vehicle 12 occurs in the longitudinal direction of the vehicle 12 as indicated by arrow LA. The linear acceleration can be designated as a positive value when the vehicle 12 is accelerating in a forward or drive direction, and can be designated as a negative value when the vehicle is braking or decelerating. As shown in FIG. 7, the centrifugal acceleration of the vehicle 12 occurs along a radius of an arcuate path as indicated by arrow CA. The centrifugal acceleration can be designated as a positive value when the vehicle 12 is angularly accelerating along an arcuate path, and can be designated as a negative value when the vehicle 12 is angularly decelerating along an arcuate path. As further indicated in FIGS. 6 and 7, the gravitational force G extends in a direction normal to a direction in which a level horizontal plane H extends.

Figure 8:
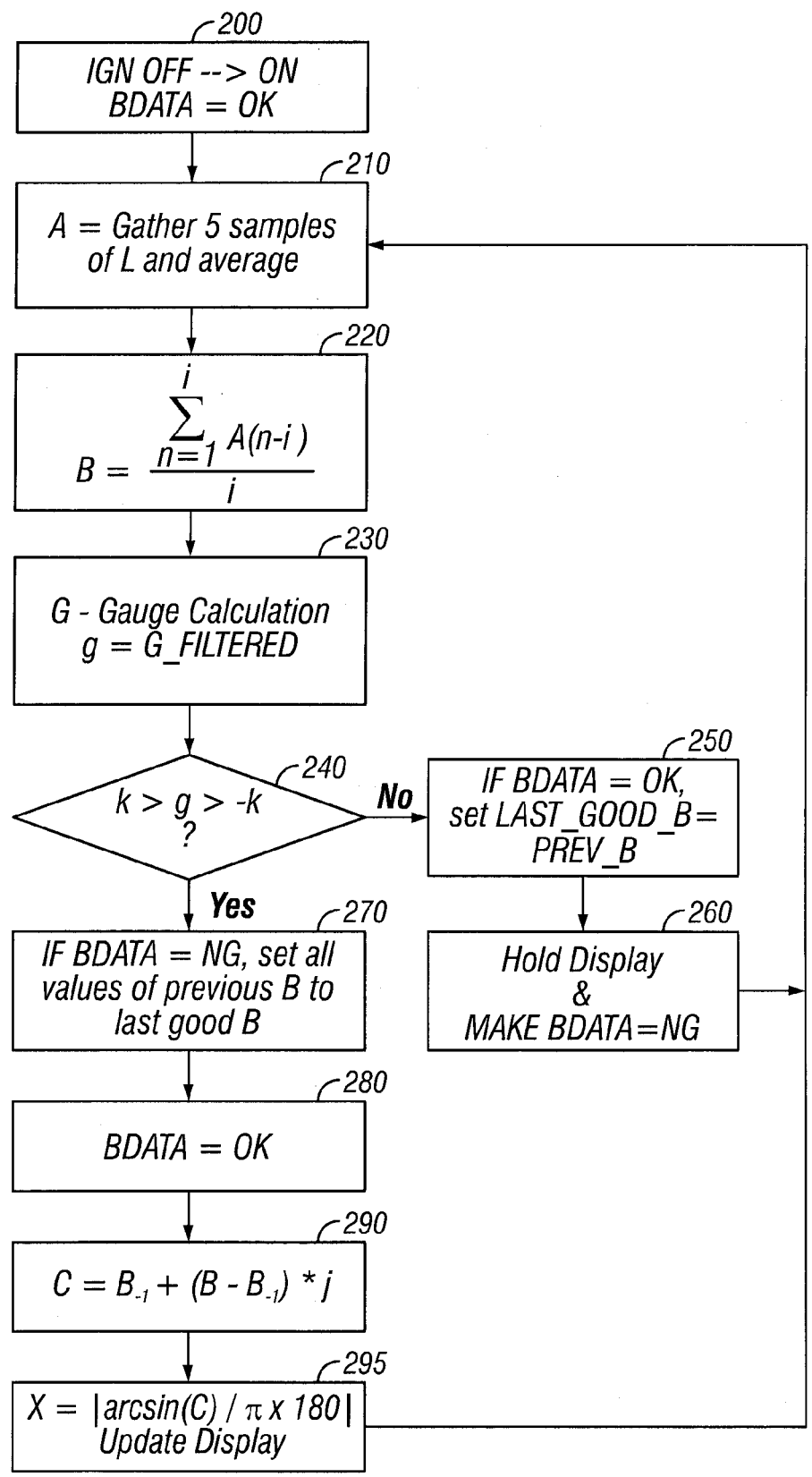
FIG. 8 is a flow chart illustrating an example of operations performed by the vehicle orientation indicator system for determining a pitch angle of the vehicle according to a disclosed embodiment.

As shown in the flowchart of FIG. 8, the processing for updating the displayed pitch angle begins in step 200 when the ignition IGN is turned on and the signal processing component 74 sets the value of BDATA to OK. In step 210, the signal processing component 74 gathers a number of samples of data L representative of the gravitational force imposed on the vehicle 12 as detected by the transverse/longitudinal gravitational force sensor 68. Thus, the transverse/longitudinal gravitational force sensor 68 can be considered to be a sensor that is configured to sense a gravitational force component imposed on the vehicle 12. In this event, the transverse/longitudinal gravitational force sensor 68 is configured to sense the gravitational force component that is imposed in a direction which is at an angle with respect to a longitudinal direction of the vehicle 12. The signal processing component 74 averages those samples of data L to determine an average value A. In this example, the number of samples is 5. However, the average can be determined based on any suitable number of samples. Furthermore, if a value of L is greater than 1, the signal processing component 74 can replace the value of L with 1 before computing the average A. Likewise, if a value of L is less than −1, the signal processing component 74 can replace the value L with −1 before computing the average A.

In step 220, the signal processing component 74 determines a moving average B of the average value A. That is, as understood in the art, as 5 new values of data representative of the gravitational force is gathered, the moving average B is calculated based on an average of the values of A including the recently determined value of A. Hence, the moving average B updates in step 220 each time a new value of A is determined.

Figure 9:
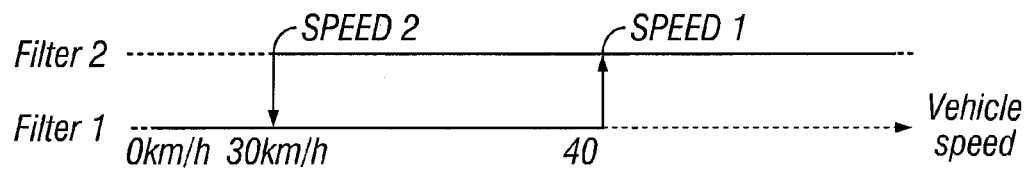
FIG. 9 is a graph illustrating an example of a relationship between filter values used in determining the pitch and roll angles and the speed of the vehicle.

As can be appreciated from the graph shown in FIG. 9, while the speed of the vehicle 12 is increasing from 0 to a first predetermined speed, the signal processing component 74 in this example is operating in the "Filter 1" mode and sets the value of i to 40, which means that the value of the moving average B is based on an average of 40 values of A. However, when the speed of the vehicle 12 reaches the first predetermined speed (Speed 1), the signal processing component 74 begins to operate in the "Filter 2" mode and sets the value of i to 20, which means that the value of the moving average B is based on an average of 20 values of A. Also, while the speed of the vehicle 12 is above the first predetermined speed and then begins to decrease to below the first predetermined speed, the signal processing component 74 continues to operate in the "Filter 2" mode and sets the value of i to 20 until the speed of the vehicle 12 has decreased to the second predetermined speed (Speed 2). When this occurs, the signal processing component 74 begins operating in the "Filter 1" mode and sets the value of i to 40. In this example, the first predetermined speed (Speed 1) is equal to 40 km/hr and the second predetermined speed (Speed 2) is equal to 30 km/hr. However, the first and second predetermined speeds can be set to any suitable values. Likewise, the values for i in the "Filter 1" and "Filter 2" modes can be any suitable values.

As can be appreciated from the above discussion and the graph of FIG. 9, the signal processing component 74 (which can be considered a controller) is further configured to control the indicator device (e.g., the display 76) to update the representation of the pitch of the vehicle 12 at an update rate that is based on a speed of movement of the vehicle 12. In this example, the update rate is faster while the speed of movement of the vehicle 12 is no greater than a prescribed speed (e.g., Speed 1) and slower while the speed of movement of the vehicle is greater than the prescribed speed.

In step 230, the signal processing component 74 calculates a gauge value G and a filtered gauge value g. In this example, the gauge value G is calculated as a raw gauge value G_RAW according to the following equations discussed below.

At first, the filtered vehicle speed is calculated according to the following equation $$\text{VEHICLE\_SPEED\_FILTERED} = \text{VEHICLE\_SPEED\_FILTERED\_PREVIOUS} - (\text{SFF} * \text{VEHICLE\_SPEED\_FILTERED\_PREVIOUS}) + (\text{SFF} * v)$$

where v equals the vehicle speed as determined, for example, by the wheel speed sensor 66, and SFF represents a speed filter factor which, in this example, is 0.6. However, the value for SFF can be any suitable value.

The gauge value G is calculated as a raw value according to the following equation $$G\_RAW = [(\text{VEHICLE\_SPEED\_FILTERED} - \text{VEHICLE\_SPEED\_FILTERED\_PREVIOUS}) * 1000 / 3600 / 9.8] / \Delta \text{ CAN message time interval}$$

where "1000" represents 1000 meters, "3600" represents the number of seconds and "9.8" represents the acceleration of gravity in meters/seconds$^2$. Also, "Δ CAN message time interval" represents the time intervals (e.g., rate) at which data is obtained by the CAN 70 in milliseconds.

Accordingly, the filtered gauge value g is calculated according to the following equation $$G\_FILTERED = G\_FILTERED\_PREVIOUS - (\text{AFF} * G\_FILTERED\_PREVIOUS) + (\text{AFF} * G\_RAW)$$

where G_RAW is calculated as indicated in the equations above and AFF represents an acceleration filter factor which in this example is 0.4. However, the value for AFF can be any suitable value.

In step 240, the signal processing component 74 determines whether the calculated value of g is between a value of k and −k. In this example, the value of k can be 0.175 regardless of the speed of the vehicle 12. In other words, the value of k can be the same in both the "Filter 1" and "Filter 2" modes of operation. However, the value of k can be set at any suitable value. If the value of g is not between k and −k, this indicates that the acceleration is outside of an acceptable range, such as too large in the positive or negative direction. In this event, the signal processing component 74 determines in step 250 if the value of BDATA is "OK" and, if so, sets the value of LAST_GOOD_B=PREV_B. Thus, the signal processing component 74 recognizes that the current value of B may be unreliable and sets the previous value of B as the last known reliable value of B. In step 260, the signal processing component 74 therefore does not update the pitch angle displayed by display 76, but rather controls display 76 to maintain the currently displayed pitch value. The signal processing component 74 also sets the value of BDATA="NG" (no good), indicating that the current value of B may be unreliable. The processing then repeats at step 210 as discussed above.

Turning back to step 240, if the value of g is between k and −k, this indicates that the acceleration is within an acceptable range. In this event, the signal processing component 74 determines in step 270 if the value of BDATA is OK or NG. If the value of BDATA is NG, the signal processing component 74 will set the value of PREV_B to the last value of B, which is the last know reliable value of B. The signal processing component 74 then sets the value of BDATA to OK in step 280. However, if the signal processing component 74 determines in step 270 that the value of BDATA is OK, the signal processing component 74 does not set the value of PREV_B to the last value of B, but proceeds to step 280 and sets the value of BDATA to OK. After step 280, the signal processing component 74 sets a value of C according to the following equation in step 290

$$C = B_{-1} + (B - B_{-1})*j$$

where j in this example is set at a default value.

That is, as can be appreciated from the graph shown in FIG. 9, while the speed of the vehicle 12 is increasing from 0 to a first predetermined speed, the signal processing component 74 in this example is operating in the "Filter 1" mode and sets the value of j to 0.0070. However, when the speed of the vehicle 12 reaches the first predetermined speed (Speed 1), the signal processing component 74 begins to operate in the "Filter 2" mode and sets the value of j to 0.0010. Also, while the speed of the vehicle 12 is above the first predetermined speed and then begins to decrease to below the first predetermined speed, the signal processing component 74 continues to operate in the "Filter 2" mode and sets the value of j to 0.0010 until the speed of the vehicle 12 has decreased to the second predetermined speed (Speed 2). When this occurs, the signal processing component 74 begins operating in the "Filter 1" mode and sets the value of j to 0.0070. In this example, the first predetermined speed (Speed 1) is equal to 40 km/hr and the second predetermined speed (Speed 2) is equal to 30 km/hr. However, the first and second predetermined speeds can be set to any suitable values, and can be different when either determining the values of j or determining the value of i as discussed above. Likewise, the values for j in the "Filter 1" and "Filter 2" modes can be any suitable values.

Turning back to the flowchart of FIG. 8, in step 295, the signal processing component 74 sets the value of the pitch angle X equal to the following equation $$X = |\arcsin(C)/(\pi*180)|$$

where C is calculated as discussed above.

Figure 10:
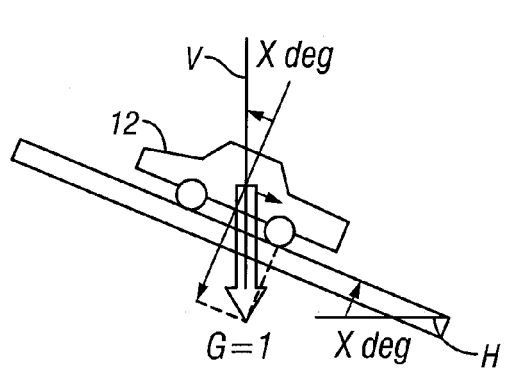
FIGS. 10 through 13 are diagrams illustrating examples of the pitch angle of the vehicle with respect to a level horizontal plane.
Figure 11:
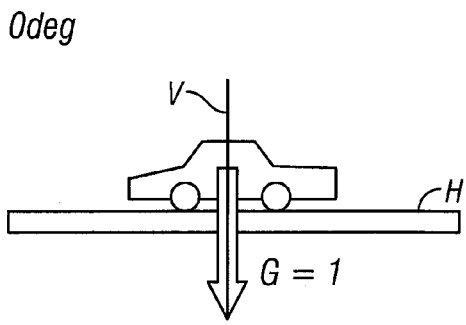
Figure 12:
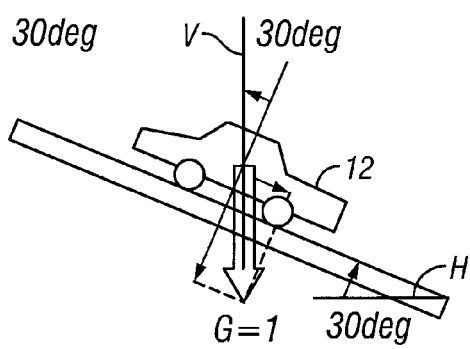
Figure 13:
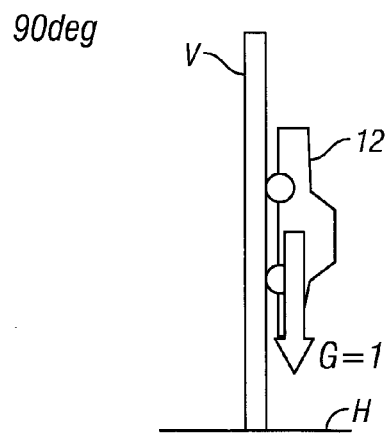

Accordingly, the signal processing component 74 controls the display 76 to display the value of the pitch angle equal to X. As shown in FIG. 10, the pitch angle X represents the pitch of the vehicle 12 with respect to the level horizontal plane H. Thus, when the vehicle 12 is parallel to the level horizontal plane H as shown in FIG. 11, the value of X equals 0 degrees. When the vehicle 12 is at a 30 degree pitch with respect to the level horizontal plane H as shown in FIG. 12, the value of X equals 30 degrees. A value of X of 90 degrees indicates that the vehicle 12 is normal in a longitudinal direction to the level horizontal plane as shown in FIG. 13. The processing then continues to step 210 and repeats as discussed above.

As can be appreciated from the above, the signal processing component 74 can be considered to be or include a controller that is configured to determine an orientation (e.g., the pitch) of the vehicle 12 with respect to a fixed plane H based on the sensed gravitational force component and control an indicator device (display 76) to provide a representation of the pitch of the vehicle 12. The controller (e.g., the signal processing component 74) is further configured to control the display 76 to update the representation of the pitch of the vehicle 12 based on a change in the sensed gravitational force component as sensed by the sensor (e.g., the transverse/longitudinal gravitational force sensor 68) while a movement condition (e.g., the value of g) of the vehicle 12 meets a prescribed condition (e.g., is between k and −k) and to control the display 76 to refrain from updating the representation of the pitch of the vehicle 12 while the movement condition fails to meet the prescribed condition.

Thus, in this example, the movement condition corresponds to a longitudinal acceleration of the vehicle 12 and the prescribed condition corresponds to a predetermined amount of longitudinal acceleration of the vehicle 12. The signal processing component 74 can determine the longitudinal acceleration based on information pertaining to at least one of braking and acceleration of the vehicle 12 as indicated by, for example, the wheel speed sensor 66. Accordingly, the signal processing component 74 is configured to control the display 76 to update the representation of the pitch of the vehicle 12 based on the change in the sensed gravitational force component as sensed by the sensor 68 while the longitudinal acceleration is no greater than the predetermined amount of longitudinal acceleration, and to control the display 76 to refrain from updating the representation of the pitch of the vehicle 12 while the longitudinal acceleration is greater than the predetermined amount of longitudinal acceleration.

Figure 14:
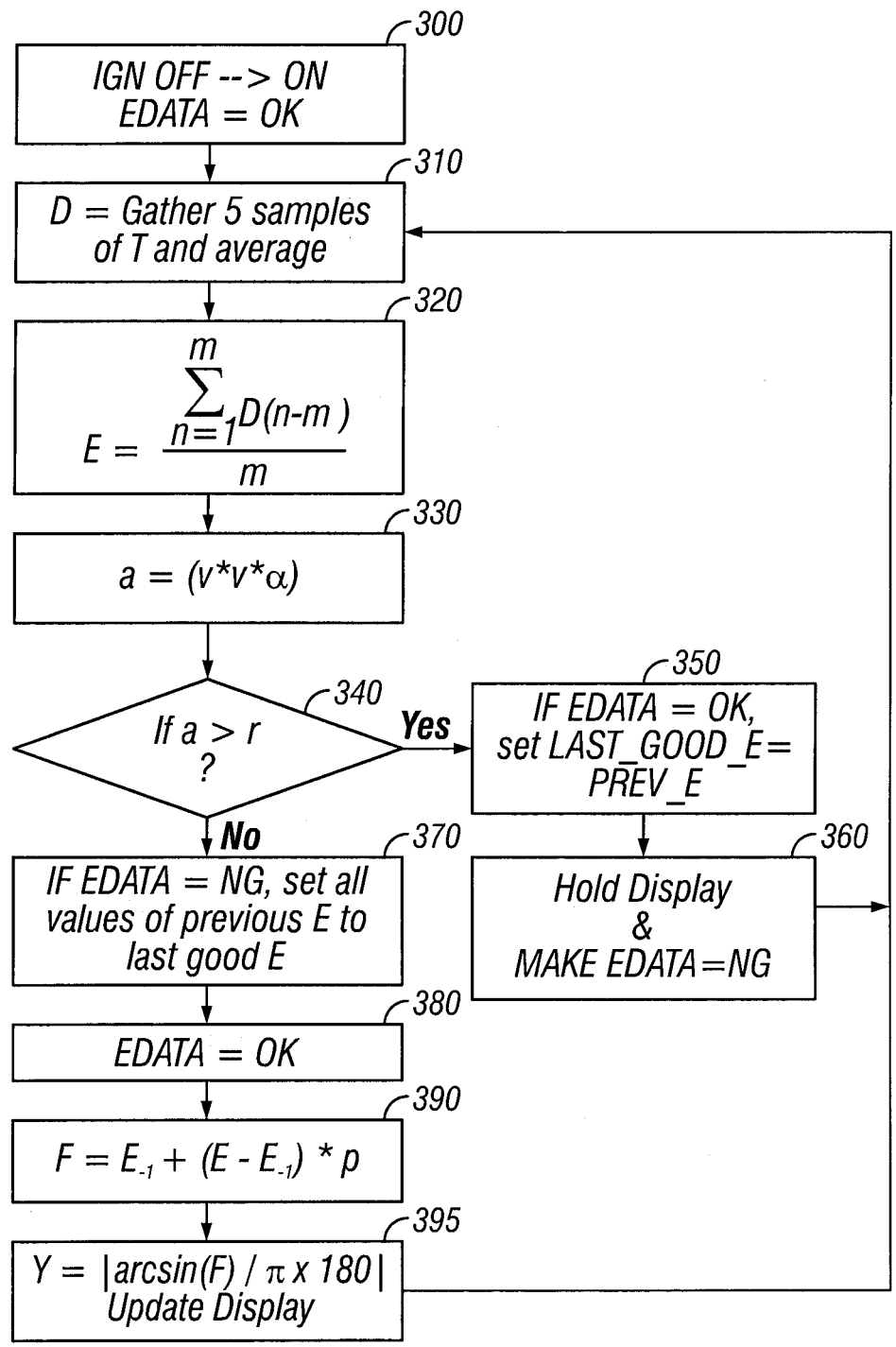
FIG. 14 is a flow chart illustrating an example of operations performed by the vehicle orientation indicator system for determining a roll angle of the vehicle according to a disclosed embodiment.
Figure 15:
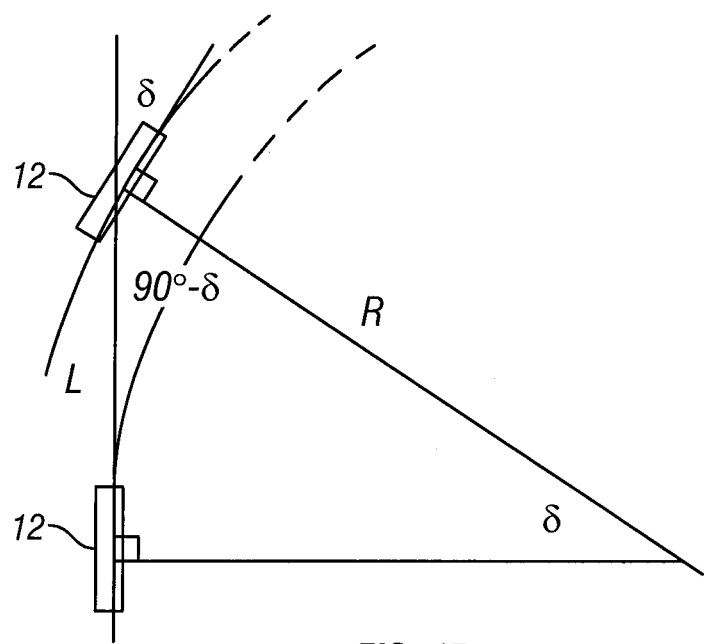
FIG. 15 is a diagram illustrating an example of a turning angle of the vehicle which can influence the data pertaining to the roll angle.

As shown in the flowchart of FIG. 14, the processing for updating the displayed roll angle begins in step 300 when the ignition IGN is turned on and the signal processing component 74 sets the value of EDAT to OK. It can be understood from the diagram of FIG. 15 that turning of the vehicle 12 along an arcuate path having a radius R can impose a centrifugal acceleration on the vehicle 12 as the vehicle 12 angularly accelerates. As discussed above, this centrifugal acceleration can adversely affect the accuracy of the roll indication of the vehicle.

In step 310 of FIG. 14, the signal processing component 74 gathers a number of samples of data T representative of the gravitational force imposed on the vehicle 12 (e.g., data from the transverse/longitudinal gravitational force sensor 68) and averages those samples to determine an average value E. Thus, the transverse/longitudinal gravitational force sensor 68 can be considered to be a sensor that is configured to sense at least one gravitational force component generated in at least one direction. In this event, the transverse/longitudinal gravitational force sensor 68 is configured to sense the gravitational force component that is imposed in a direction which is at an angle with respect to a height direction of the vehicle 12. In this example, the number of samples is 5. However, the average can be determined based on any suitable number of samples. Furthermore, if a value of T is greater than 1, the signal processing component 74 can replace the value of T with 1 before computing the average D. Likewise, if a value of T is less than −1, the signal processing component 74 can replace the value T with −1 before computing the average D.

In step 320, the signal processing component 74 determines a moving average E of the average value D. That is, as 5 new values of data representative of the gravitational force are gathered, the moving average E is calculated based on an average of the values of D including the recently determined value of D. Hence, the moving average E updates in step 320 each time a new value of D is determined.

As can be appreciated from the graph shown in FIG. 9 and as discussed above, while the speed of the vehicle 12 is increasing from 0 to a first predetermined speed, the signal processing component 74 in this example is operating in the "Filter 1" mode and sets the value of m to 40, which means that the value of the moving average E is based on an average of 40 values of D. However, when the speed of the vehicle 12 reaches the first predetermined speed (Speed 1), the signal processing component 74 begins to operate in the "Filter 2" mode and sets the value of m to 20, which means that the value of the moving average E is based on an average of 20 values of D. Also, while the speed of the vehicle 12 is above the first predetermined speed and then begins to decrease to below the first predetermined speed, the signal processing component 74 continues to operate in the "Filter 2" mode and sets the value of m to 20 until the speed of the vehicle 12 has decreased to the second predetermined speed (Speed 2). When this occurs, the signal processing component 74 begins operating in the "Filter 1" mode and sets the value of m 40. In this example, the first predetermined speed (Speed 1) is equal to 40 km/hr and the second predetermined speed (Speed 2) is equal to 30 km/hr. However, the first and second predetermined speeds can be set to any suitable values. Likewise, the values for i in the "Filter 1" and "Filter 2" modes can be any suitable values.

As can be appreciated from the above discussion and the graph of FIG. 9, the signal processing component 74 is further configured to control the display 76 to update the representation of the roll of the vehicle 12 at an update rate that is based on a speed of movement of the vehicle 12. In this example, the update rate is faster while the speed of movement of the vehicle 12 is no greater than a prescribed speed (e.g., Speed 1) and slower while the speed of movement of the vehicle is greater than the prescribed speed.

In step 330, the signal processing component 74 calculates a circular motion acceleration value a according to the following equation $$a = v*v*\alpha$$

where v represents the speed of the vehicle 12 as determined, for example, by the wheel speed sensor 66 and α represents the tire angle as determined, for example, by the steering angle sensor 64.

In step 340, the signal processing component 74 determines whether the calculated value of 'a' is greater than a value of r. In this example, the value of r can be 34 regardless of the speed of the vehicle 12. In other words, the value of r can be the same in both the "Filter 1" and "Filter 2" modes of operation. However, the value of r can be set at any suitable value. If the value of 'a' is greater than 'r', this indicates that the circular motion acceleration is outside of an acceptable range, such as too large. In this event, the signal processing component 74 determines in step 350 if the value of EDATA is "OK" and, if so, sets the value of LAST_GOOD_E=PREV_E. Thus, the signal processing component 74 recognizes that the current value of E may be unreliable and sets the previous value of E as the last known reliable value of E. In step 360, the signal processing component 74 therefore does not update the roll angle displayed by display 76, but rather controls display 76 to maintain the currently displayed roll angle. The signal processing component 74 also sets the value of EDATA="NG" (no good), indicating that the current value of E may be unreliable. The processing then repeats at step 310 as discussed above.

Turning back to step 340, if the value of 'a' is not greater than 'r', this indicates that the acceleration is within an acceptable range. In this event, the signal processing component 74 determines in step 370 if the value of EDATA is OK or NG. If the value of EDATA is NG, the signal processing component 74 will set the value of PREV_E to the last value of E, which is the last know reliable value of E. The signal processing component 74 then sets the value of EDATA to OK in step 380. However, if the signal processing component 74 determines in step 370 that the value of EDATA is OK, the signal processing component 74 does not set the value of PREV_E to the last value of B, but proceeds to step 380 and sets the value of EDATA to OK. After step 380, the signal processing component 74 sets a value of F according to the following equation in step 390

$$F = E_{-1} + (E - E_{-1})*p$$

where p in this example is set at a default value.

That is, as discussed above with regard to the graph shown in FIG. 9, while the speed of the vehicle 12 is increasing from 0 to a first predetermined speed, the signal processing component 74 in this example is operating in the "Filter 1" mode and sets the value of p to 0.0005. However, when the speed of the vehicle 12 reaches the first predetermined speed (Speed 1), the signal processing component 74 begins to operate in the "Filter 2" mode and sets the value of p to 0.0010. Also, while the speed of the vehicle 12 is above the first predetermined speed and then begins to decrease to below the first predetermined speed, the signal processing component 74 continues to operate in the "Filter 2" mode and sets the value of p to 0.0010 until the speed of the vehicle 12 has decreased to the second predetermined speed (Speed 2). When this occurs, the signal processing component 74 begins operating in the "Filter 1" mode and sets the value of p to 0.0005. In this example, the first predetermined speed (Speed 1) is equal to 40 km/hr and the second predetermined speed (Speed 2) is equal to 30 km/hr. However, the first and second predetermined speeds can be set to any suitable values, and can be different when either determining the values of p or determining the values of i and j as discussed above. Likewise, the values for p in the "Filter 1" and "Filter 2" modes can be any suitable values.

Turning back to the flowchart of FIG. 14, in step 395, the signal processing component 74 sets the value of the pitch angle Y equal to the following equation $$Y = |\arcsin(F)/(\pi*180)|$$

where F is calculated as discussed above.

Figure 16:
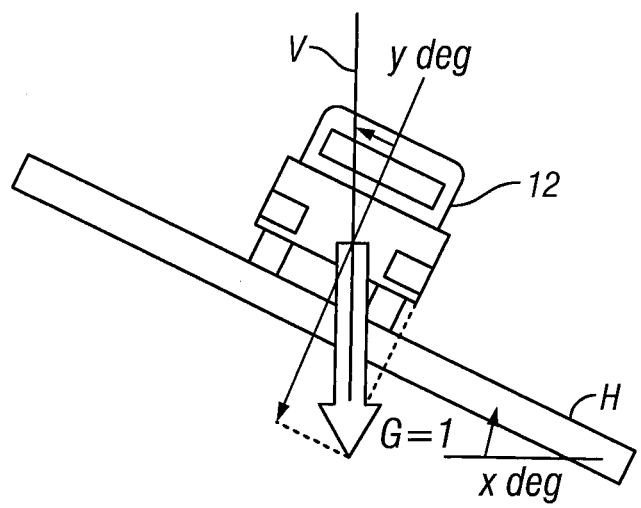
FIGS. 16 through 19 are diagrams illustrating examples of the roll angle of the vehicle with respect to a level horizontal plane.
Figure 17:
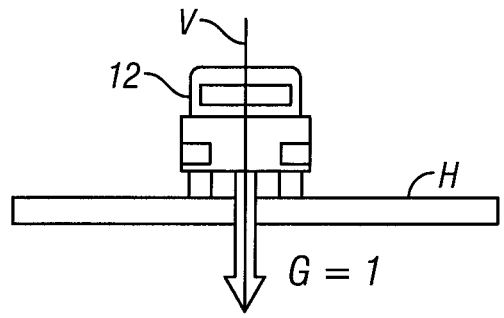
Figure 18:
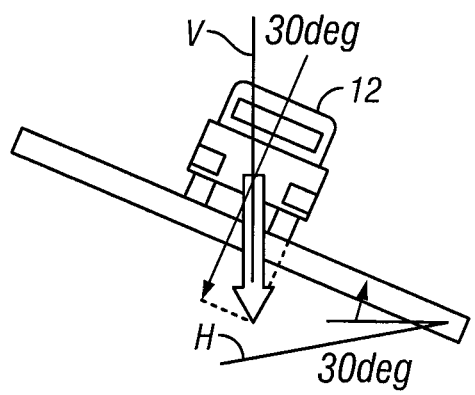
Figure 19:
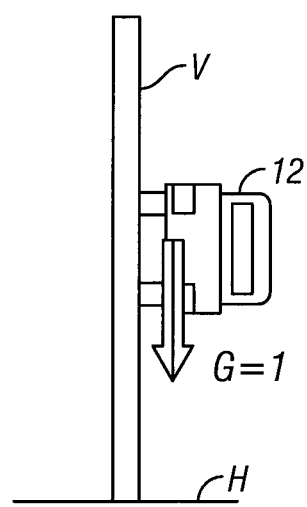

Accordingly, the signal processing component 74 controls the display 76 to display the value of the roll angle equal to Y. As shown in FIG. 16, the roll angle Y represents the roll of the vehicle 12 with respect to the level horizontal plane H. Thus, when the vehicle 12 is parallel to the level horizontal plane H as shown in FIG. 17, the value of Y equals 0 degrees. When the vehicle 12 is at a 30 degree pitch with respect to the level horizontal plane H as shown in FIG. 18, the value of Y equals 30 degrees. A value of Y of 90 degrees indicates that the vehicle 12 is normal in a widthwise direction to the level horizontal plane as shown in FIG. 19. The processing then continues to step 310 and repeats as discussed above.

As can be appreciated from the above, the signal processing component 74 can further be considered to be or include a controller that is configured to determine an orientation (e.g., the roll) of the vehicle 12 with respect to a fixed plane H based on the sensed gravitational force component and control the indicator device (display 76) to provide a representation of the orientation of the vehicle 12. The signal processing component 74 is further configured to control the display 76 to update the representation of the roll of the vehicle 12 based on a change in the sensed gravitational force component as sensed by the sensor while a movement condition (e.g., the value of a) of the vehicle 12 meets a prescribed condition (e.g., is not greater than r) and to control the display 76 to refrain from updating the representation of the roll of the vehicle 12 while the movement condition fails to meet the prescribed condition.

Thus, in this example, the movement condition corresponds to an angular acceleration of the vehicle 12 and the prescribed condition corresponds to a predetermined amount of angular acceleration of the vehicle 12. The signal processing component 74 is thus configured to control the display 76 to update the representation of the roll of the vehicle 12 based on the change in the sensed gravitational force component as sensed by the sensor 68 while the angular acceleration is no greater than the predetermined amount of angular acceleration, and to control the display to refrain from updating the representation of the orientation of the vehicle 12 while the angular acceleration is greater than the predetermined amount of angular acceleration.

General Interpretation Of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle orientation indicator comprising:
    a sensor configured to sense a gravitational force component imposed on a vehicle; and
    a controller configured to determine an orientation of the vehicle with respect to a fixed plane based on the sensed gravitational force component and control an indicator device to provide a representation of the orientation of the vehicle, the controller being further configured to control the indicator device to update the representation of the orientation of the vehicle based on a change in the sensed gravitational force component as sensed by the sensor while a movement condition of the vehicle meets a prescribed condition and to control the indicator device to refrain from updating the representation of the orientation of the vehicle while the movement condition fails to meet the prescribed condition.

2. The vehicle orientation indicator according to claim 1, wherein
    the movement condition corresponds to a longitudinal acceleration of the vehicle and the prescribed condition corresponds to a predetermined amount of longitudinal acceleration of the vehicle, such that the controller is configured to control the indicator device to update the representation of the orientation of the vehicle based on the change in the sensed gravitational force component as sensed by the sensor while the longitudinal acceleration is no greater than the predetermined amount of longitudinal acceleration and to control the indicator device to refrain from updating the representation of the orientation of the vehicle while the longitudinal acceleration is greater than the predetermined amount of longitudinal acceleration.

3. The vehicle orientation indicator according to claim 2, wherein
    the controller is configured to determine the longitudinal acceleration based on information pertaining to at least one of braking and acceleration of the vehicle.

4. The vehicle orientation indicator according to claim 1, wherein
    the movement condition corresponds to an angular acceleration of the vehicle and the prescribed condition corresponds to a predetermined amount of angular acceleration of the vehicle, such that the controller is configured to control the indicator device to update the representation of the orientation of the vehicle based on the change in the sensed gravitational force component as sensed by the sensor while the angular acceleration is no greater than the predetermined amount of angular acceleration and to control the indicator device to refrain from updating the representation of the orientation of the vehicle while the angular acceleration is greater than the predetermined amount of angular acceleration.

5. The vehicle orientation indicator according to claim 4, wherein
    the controller is configured to determine the angular acceleration based on information pertaining to a turning angle and speed of the vehicle.

6. The vehicle orientation indicator according to claim 1, wherein the sensor is configured to sense the gravitational force component that is imposed in a direction which is at an angle with respect to a longitudinal direction of the vehicle; and the controller is configured to determine the orientation as an indication of a degree of pitch of the vehicle with respect to the fixed plane based on the sensed gravitational force component and control the indicator device to provide the representation as the indication of the degree of pitch of the vehicle that corresponds to the angle.

7. The vehicle orientation indicator according to claim 6, wherein the movement condition corresponds to a longitudinal acceleration of the vehicle and the prescribed condition corresponds to a predetermined amount of longitudinal acceleration of the vehicle, such that the controller is configured to control the indicator device to update the indication of the degree of pitch of the vehicle based on the change in the sensed gravitational force component as sensed by the sensor while the longitudinal acceleration is no greater than the predetermined amount of longitudinal acceleration and to control the indicator device to refrain from updating the indication of the degree of pitch of the vehicle while the longitudinal acceleration is greater than the predetermined amount of longitudinal acceleration.

8. The vehicle orientation indicator according to claim 1, wherein the sensor is configured to sense the gravitational force component that is imposed at an angle with respect to a height direction of the vehicle; and the controller is configured to determine the orientation as an indication of a degree of roll of the vehicle with respect to the fixed plane based on the sensed gravitational force component and control the indicator device to provide the representation as the indication of the degree of roll of the vehicle that corresponds to the angle.

9. The vehicle orientation indicator according to claim 8, wherein the movement condition corresponds to an angular acceleration of the vehicle and the prescribed condition corresponds to a predetermined amount of angular acceleration of the vehicle, such that the controller is configured to control the indicator device to update the indication of the degree of roll of the vehicle based on the change in the sensed gravitational force component as sensed by the sensor while the angular acceleration is no greater than the predetermined amount of angular acceleration and to control the indicator device to refrain from updating the indication of the degree of roll of the vehicle while the angular acceleration is greater than the predetermined amount of angular acceleration.

10. The vehicle orientation indicator according to claim 1, wherein the controller is further configured to control the indicator device to update the representation of the orientation of the vehicle at an update rate that is based on a speed of movement of the vehicle.

11. The vehicle orientation indicator according to claim 10, wherein the controller is configured to control the indicator device to update the representation of the orientation of the vehicle at the update rate that is faster while the speed of movement of the vehicle is no greater than a prescribed speed and slower while the speed of movement of the vehicle is greater than the prescribed speed.

12. The vehicle orientation indicator according to claim 1, wherein the controller is further configured to adjust the prescribed condition.

13. The vehicle orientation indicator according to claim 1, wherein the fixed plane corresponds to a level horizontal plane.

14. The vehicle orientation indicator according to claim 1, wherein the controller is configured to determine the orientation of the vehicle with respect to the fixed plane based on the sensed gravitational force component by averaging a plurality of measurements of the gravitational force component performed by the sensor over a period of time.

* * * * *